United States Patent
Suzuki

(10) Patent No.: US 11,306,823 B2
(45) Date of Patent: Apr. 19, 2022

(54) SEALING STRUCTURE

(71) Applicant: FANUC CORPORATION, Yamanashi (JP)

(72) Inventor: Toyoaki Suzuki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 183 days.

(21) Appl. No.: 16/715,362

(22) Filed: Dec. 16, 2019

(65) Prior Publication Data

US 2020/0191277 A1 Jun. 18, 2020

(30) Foreign Application Priority Data

Dec. 17, 2018 (JP) .............................. JP2018-235299

(51) Int. Cl.
  *F16J 15/40* (2006.01)
  *F16C 32/06* (2006.01)
  *F16J 15/00* (2006.01)
  *F16J 15/44* (2006.01)

(52) U.S. Cl.
  CPC ........... *F16J 15/40* (2013.01); *F16C 32/0666* (2013.01); *F16J 15/002* (2013.01); *F16J 15/44* (2013.01)

(58) Field of Classification Search
  CPC .. F16J 15/40; F16J 15/44; F16J 15/441; F16J 15/002; F16C 32/0666
  See application file for complete search history.

(56) References Cited

U.S. PATENT DOCUMENTS

| | | | | |
|---|---|---|---|---|
| 3,778,123 A * | 12/1973 | Hendler | ................ | F16C 17/026 384/132 |
| 5,152,539 A * | 10/1992 | Takii | ........................ | F16J 15/43 277/347 |
| 5,238,254 A * | 8/1993 | Takii | ...................... | F16C 33/765 277/347 |
| 5,575,567 A * | 11/1996 | Brown | .................... | F16C 33/10 384/100 |
| 6,671,125 B1 | 12/2003 | Sumi | | |
| 2015/0014936 A1 | 1/2015 | Murota | | |

FOREIGN PATENT DOCUMENTS

| JP | 2001178076 A | 6/2001 |
|---|---|---|
| JP | 201516528 A | 1/2015 |

OTHER PUBLICATIONS

English Abstract for Japanese Publication No. 2015016528 A, published Jan. 29, 2015, 2 pgs.
English Abstract for Japanese Publication No. 2001178076 A, published Jun. 29, 2001, 1 pg.

* cited by examiner

*Primary Examiner* — Gilbert Y Lee
(74) *Attorney, Agent, or Firm* — Fredrikson & Byron, P.A.

(57) ABSTRACT

A sealing structure includes: a first member having a first surface extending along a gravity direction in which gravity acts; a second member having a second surface facing the first surface and extending along the gravity direction; a hydrostatic bearing that is arranged on the first surface of the first member and is configured to supply a compressed liquid between the first surface and the second surface; and a seal portion having a clearance that is formed between the first surface and the second surface and is provided below the hydrostatic bearing in the gravity direction. A liquid is retained in the clearance by surface tension.

5 Claims, 3 Drawing Sheets

SEALING STRUCTURE

CROSS-REFERENCE TO RELATED APPLICATION

This application is based upon and claims the benefit of priority from Japanese Patent Application No. 2018-235299 filed on Dec. 17, 2018, the contents of which are incorporated herein by reference.

BACKGROUND OF THE INVENTION

Field of the Invention

The present invention relates to a sealing structure that seals a gap between a first member and a second member with a liquid.

Description of the Related Art

In some machine tools, air seal is employed in order to prevent a coolant fluid used when machining a workpiece, chips arising during machining or the like from entering the inside of the frame. For example, Japanese Laid-Open Patent Publication No. 2015-016528 discloses a machine tool including a gas supply means that supplies a gas for air sealing to a gas supply port arranged around a rotating part such as a shaft, and a gas supply control means that controls the amount of gas supply for air sealing.

However, the machine tool disclosed in Japanese Laid-Open Patent Publication No. 2015-016528 needs a compressor for preparing gas for air sealing, parts for supplying the gas to the periphery of the rotating part and other components, which ends up to increasing parts or components in number.

SUMMARY OF THE INVENTION

It is therefore an object of the present invention to provide a sealing structure that can achieve sealing easily.

An aspect of the present invention resides in a sealing structure including: a first member having a first surface extending along a gravity direction in which gravity acts; a second member having a second surface that faces the first surface and extends along the gravity direction; a hydrostatic bearing that is arranged on the first surface of the first member and is configured to supply a compressed liquid between the first surface and the second surface; and a seal portion having a clearance that is formed between the first surface and the second surface and is provided below the hydrostatic bearing in the gravity direction, wherein a liquid is retained in the clearance by surface tension.

According to the present invention, since the clearance in the seal portion can be sealed with a liquid held in the clearance, it is possible to easily achieve sealing without providing a compressor for preparing a gas for air seal, components for feeding the gas to the periphery of the rotating part, or the like, which would be needed in the case of air sealing.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
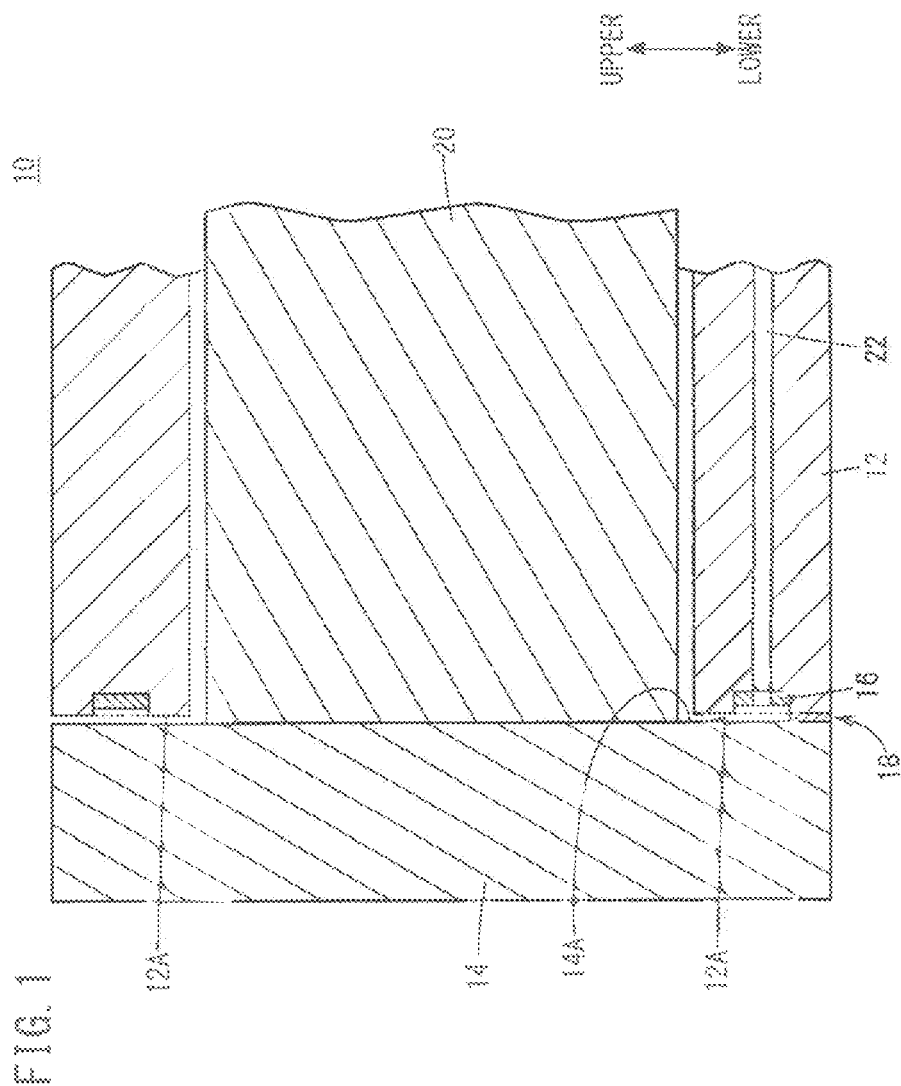
FIG. 1 is a schematic diagram showing a sealing structure.
Figure 2:
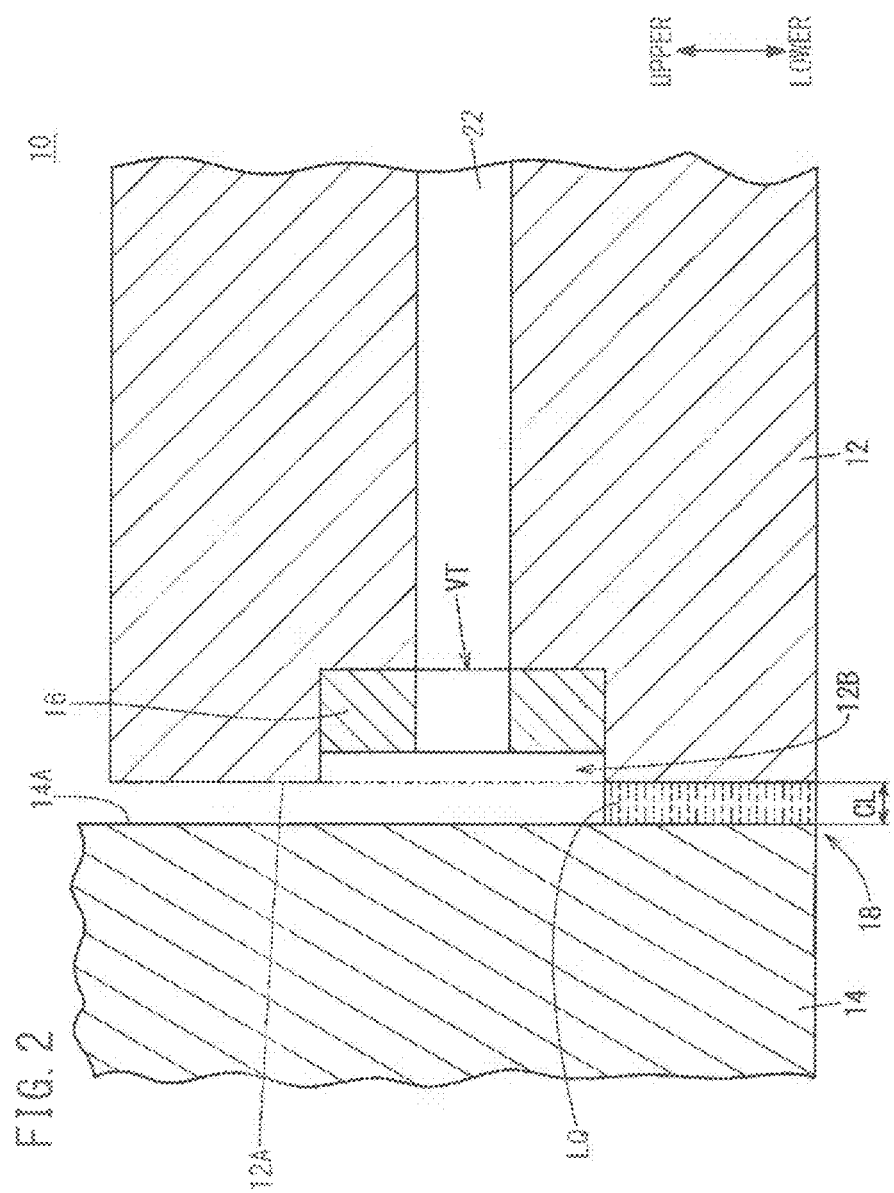
FIG. 2 is an enlarged diagram showing a part of FIG. 1.

FIG. 1 is a schematic diagram showing a sealing structure 10, and FIG. 2 is an enlarged diagram of a part of FIG. 1. The sealing structure 10 is used in machine tools and others. In the present embodiment, the sealing structure 10 is used in a machine tool. The sealing structure 10 includes a first member 12, a second member 14, a hydrostatic bearing (static pressure bearing) 16, and a seal portion 18.

The first member 12 is a member that serves as a base for supporting a spindle 20. The spindle 20 is inserted through the first member 12 in the horizontal direction, and is rotatably supported by an unillustrated radial bearing provided on the first member 12. The radial bearing may be a static pressure bearing.

The first member 12 has a first surface 12A extending in the direction of gravity (the gravity direction). The gravity direction is the direction in which gravity acts, and the first surface 12A is an end face of the first member 12 in the present embodiment. The first member 12 has a depressed portion 12B for accommodating the hydrostatic bearing 16, formed in the first surface 12A.

The second member 14 is a rotating body that rotates about the spindle 20 and is fixed to one end of the spindle 20 of the sealing structure 10. Accordingly, the second member 14 rotates together with the spindle 20. The second member 14 has a second surface 14A that faces the first surface 12A and extends along the gravity direction. The aforementioned end of the spindle 20 is attached on the second surface 14A.

The hydrostatic bearing 16 is arranged in the depressed portion 12B of the first member 12, and a compressed liquid is supplied from an unillustrated supply source to the clearance or gap between the first surface 12A and the second surface 14A, so that the thrust load of the spindle 20 is supported. Here, the compressed liquid is a liquid that is compressed. Specific examples of the compressed liquid include oil.

The compressed liquid introduced between the first surface 12A and the second surface 14A flows through the hydrostatic bearing 16 and into a discharge port VT formed on the bottom side of the depressed portion 12B of the first member 12, and is discharged to the outside through a discharge flow passage 22 formed inside the first member 12. Here, the discharge port VT may be arranged on the side surface of the depressed portion 12B or may be arranged on the first surface 12A. In short, the discharge port VT may be arranged at any position in the first member 12 as long as it is located above the seal portion 18 in the gravity direction.

The seal portion 18 has a clearance CL formed between the first surface 12A and the second surface 14A and provided below the hydrostatic bearing 16 in the gravity direction. Here, in the present embodiment, two hydrostatic bearings 16 are provided respectively on the lower side (lower side in the direction of gravity) and the upper side (upper side in the direction of gravity) of the spindle 20. The clearance CL of the seal portion 18 is provided below the lowermost hydrostatic bearing 16 of the multiple hydrostatic bearings 16 in the gravity direction.

The clearance CL is formed by the first member 12 and the second member 14. The clearance CL may be formed by a member such as a coating provided on the first surface 12A of the first member 12 and the second member 14, or may be formed by a member such as a coating provided on the second surface 14A of the second member 14 and the first member 12. Alternatively, the clearance CL may be formed by a member such as a coating provided on the first surface 12A of the first member 12 and a member such as a coating provided on the second surface 14A of the second member 14. In other words, the clearance CL of the seal portion 18 may have the same width as the gap between the first surface 12A and the second surface 14A, or may have a smaller width than the gap.

A liquid LQ is retained in the clearance CL of the seal portion 18 by surface tension. Specific examples of the liquid LQ include oil. The liquid LQ held in the clearance CL and the compressed liquid guided by the hydrostatic bearing 16 may be the same or different.

Thus, in the seal portion 18, the clearance CL is sealed with the liquid LQ held in the clearance CL of the seal portion 18. Therefore, as compared with the case of air seal, it is possible to easily create sealing without requiring a compressor for preparing an air seal gas or components for supplying the gas to the periphery of the rotating part.

Here, since the clearance CL of the seal portion 18 is provided below the hydrostatic bearing 16 in the gravity direction, cases may occur in which the compressed liquid from the hydrostatic bearing 16 stagnates over or stays on the liquid held LQ in the clearance CL when the supply of the compressed liquid is stopped. In this case, a pressure due to the weight of the compressed liquid acts on the liquid LQ. The clearance CL in the seal portion 18 of the present embodiment is set so as to retain the liquid LQ in the clearance CL even when the compressed liquid stagnates on the liquid LQ held in the clearance CL. This makes it possible to hold the liquid LQ in the clearance CL of the seal portion 18 for a longer time, hence improve sealing performance. Specifically, the clearance CL of the seal portion 18 preferably has a size of 0.1 mm or less.

On the other hand, when the compressed liquid is supplied from the hydrostatic bearing 16 to the gap between the first surface 12A and the second surface 14A, the compressed liquid is discharged from the discharge port VT to the outside through the discharge flow passage 22 as described above. That is, the first member 12 has the discharge port VT into which the compressed liquid supplied between the first surface 12A and the second surface 14A flows, so that it is possible to prevent application of the compressing pressure of the compressed liquid to the seal portion 18. It is hence possible to hold the liquid LQ in the clearance CL of the seal portion 18 for a longer time, and improve sealing performance.

[Modification]

Though the above embodiment has been described as one example of the present invention, the technical scope of the invention should not be limited to the above embodiment. It goes without saying that various modifications and improvements can be added to the above embodiment. It is also apparent from the scope of claims that the embodiment added with such modifications and improvements should be incorporated in the technical scope of the invention.

Figure 3:
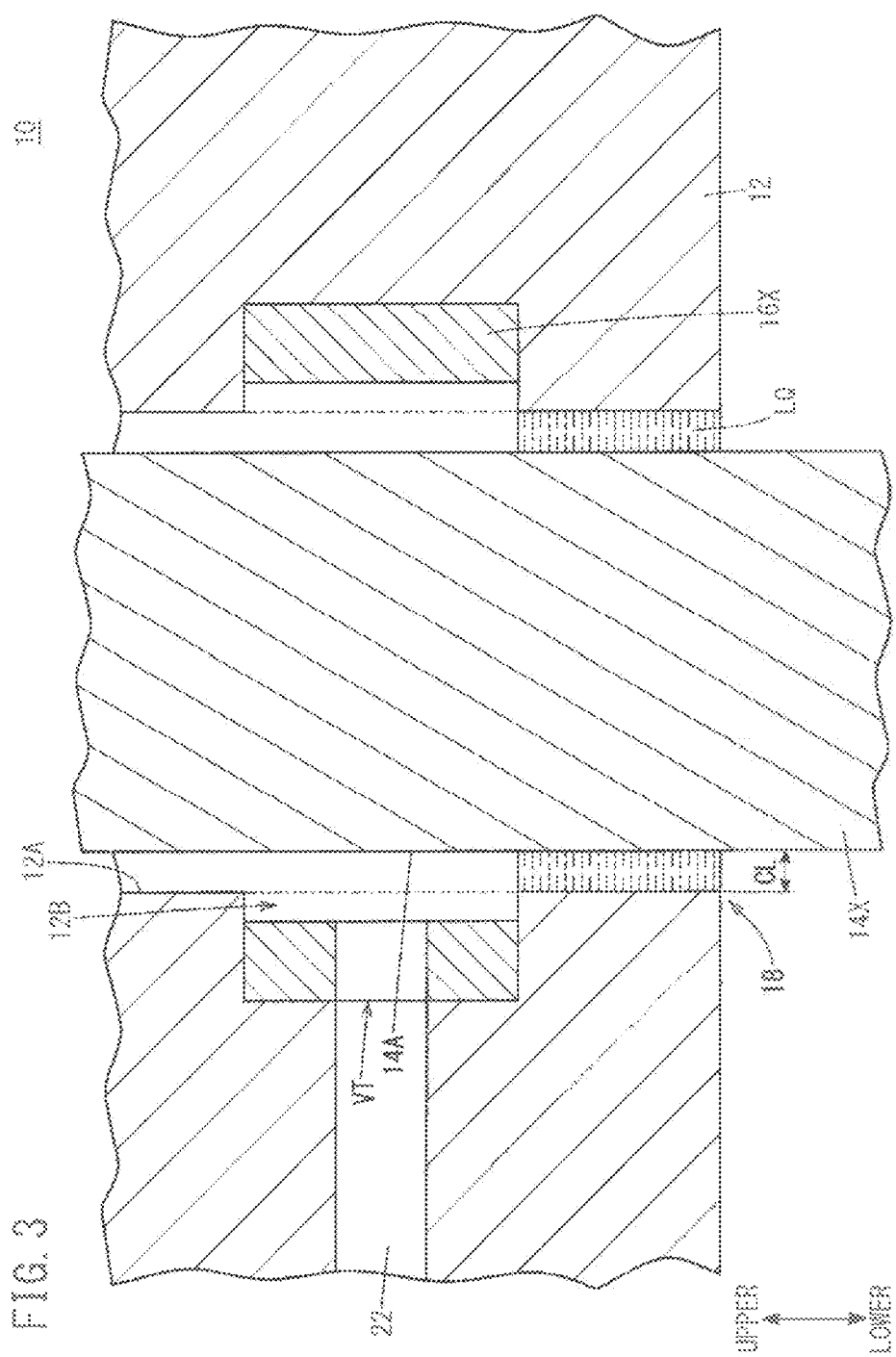
FIG. 3 is a schematic diagram showing a sealing structure of a modification.

FIG. 3 is a schematic diagram showing a sealing structure 10 of a modification. Here, the same components as those described in the above embodiment are allotted with the same reference numerals and the description overlapping the above embodiment is omitted.

In the sealing structure 10 of a modification, the second member 14X and the hydrostatic bearing 16X are different from the above embodiment. The second member 14X of the modification is a shaft that extends in the vertical direction and passes through the first member 12 vertically.

The hydrostatic bearing 16X supplies a compressed liquid between the second surface 14A of the second member 14X that passes through the first member 12 along the vertical direction and the first surface 12A of the first member 12 and thus supports the second member 14X so as to be slidable in the vertical direction relative to the first member 12.

In this way, in the modification, when the second member 14X is supported by the hydrostatic bearing 16X so as to be slidable vertically relative to the first member 12, the seal portion 18 can also seal the clearance CL with the liquid LQ in the same manner as in the above embodiment. Therefore, as compared with the case of air seal, it is possible to easily create sealing without requiring a compressor for preparing an air seal gas or components for supplying the gas to the periphery of the rotating part.

Invention Obtained from the Embodiment

The invention that can be grasped from the above embodiment and modification will be described below.

The sealing structure (10) of the invention includes: a first member (12) having a first surface (12A) extending along the gravity direction in which gravity acts; a second member (14, 14X) having a second surface (14A) that faces the first surface (12A) and extends along the gravity direction; a hydrostatic bearing (16, 16X) that is arranged on the first surface (12A) of the first member (12) and is configured to supply a compressed liquid between the first surface (12A) and the second surface (14A); and a seal portion (18) having a clearance (CL) that is formed between the first surface (12A) and the second surface (14A) and is provided below the hydrostatic bearing (16, 16X) in the gravity direction, wherein a liquid (LQ) is retained in the clearance (CL) by surface tension.

In this sealing structure (10), the clearance (CL) is sealed with the liquid (LQ) held in the clearance (CL) of the seal portion (18). Therefore, as compared with the case of air seal, it is possible to easily achieve sealing without requiring a compressor for preparing an air seal gas or components for supplying the gas to the periphery of the rotating part.

The clearance (CL) of the seal portion (18) may be set so as to retain the liquid (LQ) in the clearance even when the compressed liquid stagnates on the liquid (LQ) held in the clearance (CL). This configuration makes it possible to retain the liquid (LQ) in the clearance (CL) of the seal portion (18) for a longer time, hence improve sealing performance.

The first member (12) may have a discharge port (VT) arranged above the seal portion (18) in the gravity direction, wherein the compressed liquid supplied between the first surface (12A) and the second surface (14A) flows into the discharge port. This configuration makes it possible to prevent the compression pressure of the compressed liquid from acting on the liquid (LQ) held in the clearance (CL) of the seal portion (18). Accordingly, it is possible to retain the liquid (LQ) in the clearance (CL) of the seal portion (18) for a longer time, hence improve sealing performance.

The clearance (CL) may be formed by the first member (12) and the second member (14, 14X). This configuration can reduce the number of parts, compared to the case where the clearance (CL) is formed by attaching other parts or other members to the first member (12) and the second member (14, 14X).

The clearance (CL) may have a size of 0.1 mm or less. In the structure, it is possible to retain the liquid (LQ) in the clearance (CL) of the seal portion (18) for a longer time, hence improve sealing performance.

What is claimed is:

1. A sealing structure, comprising:
   a first member having a first surface extending along a gravity direction in which gravity acts;
   a second member having a second surface that faces the first surface and extends along the gravity direction;
   a hydrostatic bearing that is arranged on the first surface of the first member and is configured to supply a compressed liquid between the first surface and the second surface; and
   a seal portion having a clearance that is formed between the first surface and the second surface and is provided below the hydrostatic bearing in the gravity direction, wherein a liquid is retained in the clearance by surface tension.

2. The sealing structure according to claim 1, wherein the clearance of the seal portion is set so as to retain the liquid in the clearance even when the compressed liquid stagnates on the liquid held in the clearance.

3. The sealing structure according to claim 1, wherein the first member has a discharge port arranged above the seal portion in the gravity direction, and the compressed liquid supplied between the first surface and the second surface flows into the discharge port.

4. The sealing structure according to claim 1, wherein the clearance is formed by the first member and the second member.

5. The sealing structure according to claim 1, wherein the clearance has a size of 0.1 mm or less.

* * * * *